(12) United States Patent
Cheatham, III et al.

(10) Patent No.: US 9,688,402 B2
(45) Date of Patent: *Jun. 27, 2017

(54) SYSTEMS, METHODS, AND DEVICES FOR UNMANNED AERIAL VEHICLE DISPATCH AND RECOVERY

(71) Applicant: Elwha LLC, Bellevue, WA (US)

(72) Inventors: Jesse R. Cheatham, III, Seattle, WA (US); Hon Wah Chin, Palo Alto, CA (US); William David Duncan, Mill Creek, WA (US); Roderick A. Hyde, Redmond, WA (US); Muriel Y. Ishikawa, Livermore, CA (US); Jordin T. Kare, San Jose, CA (US); Tony S. Pan, Bellevue, WA (US); Robert C. Petroski, Seattle, WA (US); Clarence T. Tegreene, Mercer Island, WA (US); David B. Tuckerman, Lafayette, CA (US); Yaroslav A. Urzhumov, Bellevue, WA (US); Thomas Allan Weaver, San Mateo, CA (US); Lowell L. Wood, Jr., Bellevue, WA (US); Victoria Y. H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/682,985

(22) Filed: Apr. 9, 2015

(65) Prior Publication Data

US 2016/0297521 A1 Oct. 13, 2016

(51) Int. Cl.
*G01C 23/00* (2006.01)
*B64C 39/02* (2006.01)
*G08G 5/00* (2006.01)
*G05D 1/00* (2006.01)
*B64D 1/00* (2006.01)
(Continued)

(52) U.S. Cl.
CPC .............. *B64C 39/024* (2013.01); *B64D 1/00* (2013.01); *B64D 1/22* (2013.01); *G05D 1/0088* (2013.01); *G06Q 20/145* (2013.01); *G08G 5/0008* (2013.01); *G08G 5/0013* (2013.01); *G08G 5/0056* (2013.01); *G08G 5/0069* (2013.01); *G08G 5/0078* (2013.01); *G08G 5/0086* (2013.01); *B64C 2201/024* (2013.01); *B64C 2201/108* (2013.01); *B64C 2201/12* (2013.01); *B64C 2201/141* (2013.01)

(58) Field of Classification Search
CPC ....... G08G 5/0069; G08G 5/025; G08G 5/045
USPC ............... 701/2, 3, 11, 13, 14, 16, 120, 467; 340/947; 244/75.1
See application file for complete search history.

(56) References Cited

U.S. PATENT DOCUMENTS

8,199,643 B2 6/2012 Hirsch et al.
9,195,938 B1 * 11/2015 Bonawitz ................. G06N 5/02
(Continued)

*Primary Examiner* — Gertrude Arthur Jeanglaud (57) ABSTRACT

A service unmanned aerial vehicle (UAV) includes a flight system, a status component, a navigation system, and a recovery component. The flight system is for flying the service UAV. The status component is configured to determine that a first UAV is disabled. The navigation system is configured to fly the service UAV to a landing location of the first UAV in response to the status component determining that the first UAV is disabled. The recovery component is configured to recover one or more of a payload of the first UAV and a portion of the first UAV.

33 Claims, 5 Drawing Sheets

(51) Int. Cl.
*G06Q 20/14* (2012.01)
*B64D 1/22* (2006.01)

(56) References Cited

U.S. PATENT DOCUMENTS

| | | |
|---|---|---|
| 2006/0249622 A1 | 11/2006 | Steele |
| 2010/0182969 A1 | 7/2010 | Hirsch et al. |
| 2011/0006151 A1 | 1/2011 | Beard |
| 2012/0080556 A1* | 4/2012 | Root, Jr. ............... B64F 1/02 244/63 |
| 2014/0025228 A1 | 1/2014 | Jang et al. |
| 2015/0142211 A1* | 5/2015 | Shehata ............... H04N 7/181 701/2 |
| 2016/0068265 A1* | 3/2016 | Hoareau ............... B64C 39/024 701/3 |
| 2016/0068268 A1 | 3/2016 | Bookless et al. |

* cited by examiner

SYSTEMS, METHODS, AND DEVICES FOR UNMANNED AERIAL VEHICLE DISPATCH AND RECOVERY

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).
Priority Applications:
None.
Related Applications:
If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Unmanned aerial vehicles (UAVs) are fully autonomous, partially autonomous, or fully human-controlled aerial vehicles that do not have a cockpit for a human pilot, or that do not require the onboard presence of a human pilot. For example, UAVs may require a skilled pilot who remotely controls all aspects of operation using a computer or other controller. Similarly, other UAVs may be partially or fully automated such that only some, little, or no human intervention is required. UAVs may also be referred to as remote-controlled aerial vehicles, drones, or other terms. UAVs come in a variety of form factors, including airplanes, gliders, helicopters, or any other type of aerial vehicle. Helicopter type vehicles may include one or more rotors; for example, a quadropter has four rotors.

Because no human pilot is required onboard a UAV, the UAV can be smaller in size and eliminate at least some complexity that may generally be used to provide for human comfort or safety. This can lead to reduced cost, the ability to perform automated tasks, and many other benefits. Because of these and other benefits, it is anticipated that UAVs will experience high levels of growth for hobby, military, and commercial purposes. However, the increased use of UAVs may lead to greater risk of damaging the property of others, such as by crashing or causing fires. Furthermore, UAVs may carry valuable payload or may represent a significant loss if recovered by a competitor or a looter.

Based on the foregoing, Applicants have recognized a need for providing assistance to disabled or downed UAVs to reduce potential loss or damage. One embodiment of a service UAV includes a flight system, a status component, a navigation system, and a recovery component. The flight system allows or enables the service UAV to fly. The status component is configured to determine that a first UAV is disabled. The navigation system is configured to control the flight system to fly the service UAV to a landing location of the first UAV in response to the status component determining that the first UAV is disabled. The recovery component is configured to recover one or more of a payload of the first UAV and a portion of the first UAV.

One embodiment of a UAV assistance system includes one or more processors and computer readable media collectively storing executable instructions that, when executed by the one or more processors, cause the UAV assistance system to perform certain functions. The executable instructions cause the UAV assistance system to receive, process, or decode an indication that a UAV is disabled. The indication that the UAV is disabled may be received in response to the first UAV making an unplanned landing, or determining that it needs to make an unplanned landing. The executable instructions cause the UAV assistance system to determine or identify a service UAV available for assisting the UAV. The executable instructions cause the UAV assistance system to transmit a message dispatching the service UAV to provide assistance to the first UAV.

By way of example, sometimes a UAV may need to make an emergency landing or crash. For example, the UAV may run out of fuel or power, have a malfunction, or experience some other failure or disablement. According to one embodiment, a service UAV (rather than a land vehicle or human-operated aerial vehicle) may be dispatched to take care of the downed UAV. In one embodiment, the service UAV brings fuel, filling either by liquid transfer, by recharging, or by whole-tank or battery transfer. In one embodiment, the service UAV recharges the downed UAV's batteries. In the case of a nonfunctioning UAV, the service UAV may simply pick it up and fly it to a safe location or the owner, or it may rescue the UAV's payload. The service UAV may fly over a coverage region, ready for quick response. Or, the service UAV may roost somewhere and fly in upon need. In some cases, a flight-stationed service UAV may respond fast enough to catch the needy UAV in a net before it lands, or the needy UAV may be able to prolong its flight long enough for this to happen. In some cases, the service UAV may simply hover overhead of a downed UAV and protect its payload from looting. The services of a service UAV may be provided by a business, with which other UAV owners contract.

Figure 1:
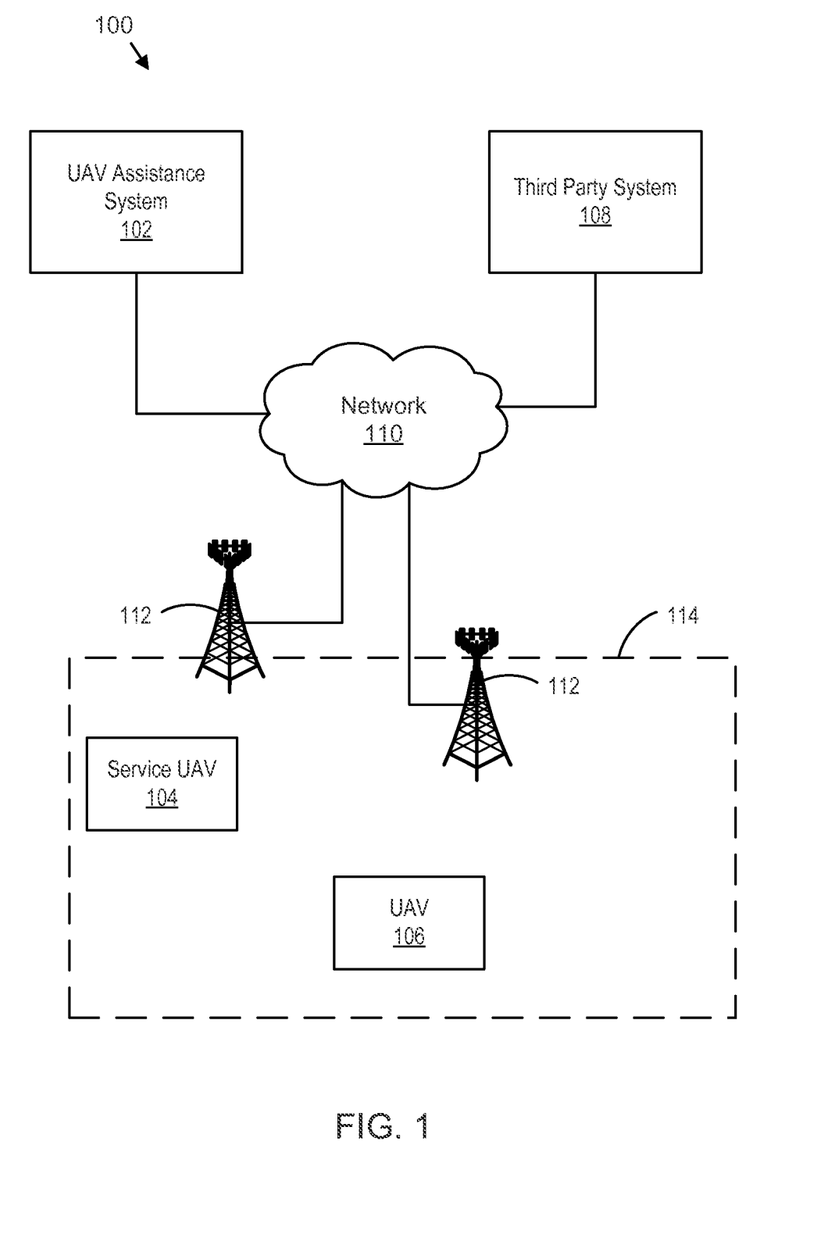
FIG. 1 is a schematic block diagram of a system for providing assistance to one or more disabled unmanned aerial vehicles (UAVs), consistent with embodiments disclosed herein.

FIG. 1 is a schematic block diagram illustrating one embodiment of a system 100 for providing assistance to a UAV 106. The system 100 includes a UAV assistance system 102, a service UAV 104, and a third party system 108. The UAV assistance system 102, service UAV 104, UAV 106, and third party system 108 may communicate with each other directly (e.g., via radio) or may communicate with each other via a network 110. In one embodiment, since the service UAV 104 and UAV 106 are mobile, the service UAV 104 and UAV 106 may communicate with each other and/or the UAV assistance system 102 and third party system 108 via base stations 112. The base stations 112 may include nodes and/or network controllers for any type of wireless communication network such as a wide area network (WAN) cellular network, or wireless local area network (WLAN). In one embodiment, the service UAV 104 and UAV 106 may be able to communicate directly with each other using a wireless communication standard such as WiFi, Bluetooth, or the like. For example, the service UAV 104 may relay messages to the network 110 for the UAV 106.

In one embodiment, the UAV assistance system 102 monitors a status of the UAV 106 and/or the service UAV 104. The UAV assistance system 102 may include a computing device such as a server, workstation, or the like. The UAV assistance system 102 may determine that the UAV 106 needs assistance and dispatch the service UAV 104 to provide that assistance. In some embodiments, a plurality of service UAVs and served UAVs may be monitored. The service UAV 104 may respond to messages from the UAV assistance system 102 to provide any services needed by the UAV 106. For example, the service UAV 104 may fly to a location of the UAV 106 and provide a service indicated by the UAV assistance system 102, indicated by the UAV 106, or autonomously determined by the service UAV 104. In one embodiment, the service UAV 104 may be available to provide assistance to UAVs within a specific geographical area 114. The UAV 106 may include a UAV that has subscribed to services of the UAV assistance system 102. The UAV 106 may include a hobby, military, or commercial UAV. For example, the UAV 106 may be used for surveillance, package delivery, communication services, or any other use. In one embodiment, the UAV 106 is another service UAV. The third party system 108 may be a system that provides authorization for assistance to the UAV 106, receives billing information, or receives other information about the UAV 106 that may be forwarded to an owner or operator of the UAV.

Figure 2:
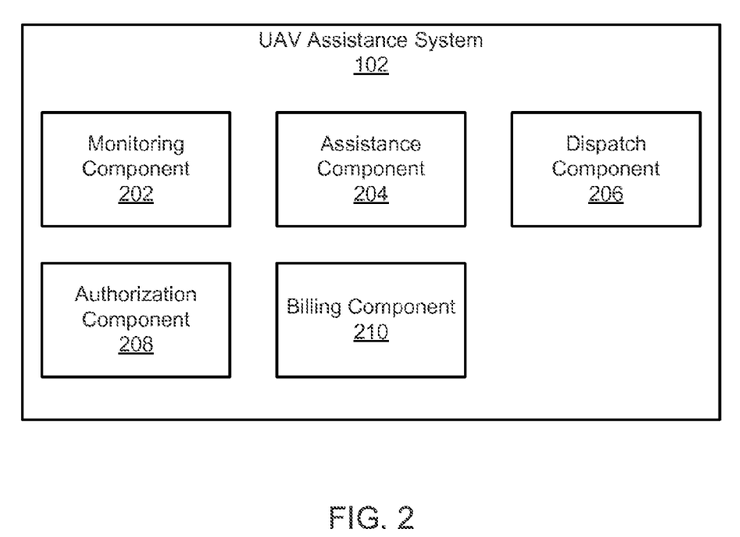
FIG. 2 is a schematic block diagram of a UAV assistance system, consistent with embodiments disclosed herein.

FIG. 2 is a schematic block diagram illustrating components of the UAV assistance system 102, according to one embodiment. The UAV assistance system 102 includes a monitoring component 202, an assistance component 204, a dispatch component 206, an authorization component 208, and a billing component 210. The components 202-210 are given by way of example only. Some embodiments may include only one or any combination of two or more of the components 202-210, without limitation.

The monitoring component 202 determines whether one or more UAVs are disabled. In one embodiment, the monitoring component 202 may monitor a status of one or more UAVs that subscribe to an assistance service. In one embodiment, the monitoring component 202 may receive an indication that a specific UAV is disabled. For example, a UAV may send a wireless help request or an indication of a disabled status to the UAV assistance system 102, third party system 108, or other device or system. In one embodiment, the UAV may explicitly report that it has landed or will be landing unexpectedly. In one embodiment, the UAV may have onboard sensors that report its position, engine status, speed, etc., and the fact that the UAV is disabled may be determined by the monitoring component 202 or other system.

The monitoring component 202 may receive the indication that the UAV is disabled after the indication has been routed through a network 110 and/or through a third party system 108. In one embodiment, an indication that the UAV is disabled may be received from a remote sensor monitoring the UAV or based on a determination made by the remote sensor or data gathered by the remote sensor. For example, the remote sensor may be a camera or radar system that is located on a service UAV 104 or within a coverage area 114 monitored by the remote sensor.

In one embodiment, the indication that the UAV is disabled, or is otherwise experiencing partial or complete failure, may be in response to the UAV making an unplanned landing or determining that a previously unplanned landing must be made due to a problem with the operation of the UAV. In one embodiment, the indication that the UAV is disabled may include a message that also indicates a type of assistance desired by the UAV. For example, the type of assistance may include recovering a package, receiving the UAV or a portion of the UAV, providing surveillance for the UAV, or any other type of assistance. In one embodiment, the message may include an indication of a time by which assistance is desired by the UAV. For example, the UAV may have a time-sensitive objective to perform or may simply indicate that a system that can provide the assistance within the time period will be allowed to provide the assistance.

The assistance component 204 may determine that a UAV requires assistance and/or a type of assistance that is required. For example, the assistance component 204 may determine that assistance is needed in response to the monitoring component 202 determining that a UAV is disabled. The assistance component 204 may determine or identify a service UAV 104 that is available for assisting the disabled UAV.

In one embodiment, the assistance component 204 may determine whether a specific service UAV 104 is capable of providing needed assistance. For example, the assistance component 204 may determine whether a specific UAV 104 is close enough to provide assistance in a required time period or within a specific geographical area 114. Similarly, the assistance component 204 may determine whether a service UAV 104 is capable of carrying the downed UAV, a payload of the downed UAV, or a portion of the downed UAV. The assistance required may be based on a message or indication received, processed, or decoded by the monitoring component 202. The assistance component 204 may determine whether the service UAV 104 can put out a fire, provide surveillance, or provide any other service. If the service UAV 104 is capable of providing the service, the assistance component 204 may identify or select the service UAV 104 as the service UAV 104 to provide the assistance.

The dispatch component 206 is configured to dispatch a service UAV 104 to provide assistance to a disabled UAV, such as UAV 106 of FIG. 1. In one embodiment, the dispatch component 206 transmits, or prepares and causes the UAV assistance system 102 to transmit, a message dispatching a service UAV 104 to provide assistance to a disabled UAV. For example, the service UAV 104 may receive the message and then provide assistance to the disabled UAV. In one embodiment, the dispatch component 206 may additionally prepare or transmit a message reporting the dispatch of the service UAV 104 to one or more of an owner of the disabled UAV (or corresponding device or system), an operator of the disabled UAV (or corresponding device or system), or the disabled UAV itself. The message reporting the dispatch may include an estimated arrival time, service completion time, cost, or the like.

In one embodiment, the dispatch component 206 may send a plurality of messages to the service UAV 104 to provide updates or other information as it becomes known. For example, the service UAV 104 may be dispatched to an area as soon as a UAV reports trouble, and the service UAV 104 can be directed to a precise location once the disabled UAV lands or it is known where the disabled UAV will land. In one embodiment, the message dispatching the service UAV 104 may include a predicted landing location for the disabled UAV. For example, the service UAV 104 may begin to flow toward the predicted location as soon as it is known. This may allow the service UAV 104 to be dispatched earlier. The service UAV 104 may, when it gets closer, directly locate the disabled UAV autonomously (e.g., via visual identification, direct radio communication with the disabled UAV, or the like). In one embodiment, the dispatch component 206 may send an additional message indicating an actual landing location of the disabled UAV. In one embodiment, the first message sent by the dispatch component 206 may include the actual landing location for the disabled UAV.

In one embodiment, the dispatch component 206 may provide an indication of service to be provided to the disabled UAV. Example services may include replenishing or replacing an energy storage component (such as a battery or fuel tank), recovering a payload, recovering a portion of the disabled UAV, putting out a fire, discharging a battery, removing fuel, placing markers, providing surveillance to avoid looting or theft, sanitizing, moving the UAV, or any other assistance or service disclosed herein. In one embodiment, the service UAV 104 may determine what is needed once the service UAV 104 arrives on scene by observing the disabled UAV and/or communicating with a short range wireless communication standard to acquire information about the state of the UAV.

The authorization component 208 is configured to determine whether the UAV assistance system 102 or a service UAV 104 is authorized to provide assistance to a disabled UAV. In one embodiment, the authorization component 208 determines whether a disabled UAV, or an owner or operator of the disabled UAV, has a corresponding active subscription account. For example, the authorization component 208 may compare an identifier received in a message indicating that the UAV is disabled with a list of subscribed UAVs or accounts. In one embodiment, the authorization component 208 may determine that there is a contract to provide services to the disabled UAV.

In one embodiment, the authorization component 208 may authorize providing assistance to a UAV in response to receiving a message from the UAV, a third party system 108, or the like indicating that an owner or operator approves the assistance. For example, the authorization component 208 may authorize assistance on a per-occurrence basis. In one embodiment, a message indicating that the providing of assistance is approved may include an indication that payment has been received or will be provided. In one embodiment, the authorization component 208 receives an indication authorizing the UAV assistance system 102 to dispatch a service UAV 104 to provide assistance to the disabled UAV. Authorization may be exclusive or specific to a specific UAV or may be applicable to all UAVs of a specific owner or operator.

In one embodiment, the authorization component 208 may receive an indication that deauthorizes the UAV assistance system 102 from providing service to the disabled UAV. For example, the indication may include a message with an explicit indication to stay away. Or, the indication that assistance is not authorized may be implicit. For example, the message may indicate that a different service has been authorized. In one embodiment, the authorization component 208 will only allow the dispatch component 206 to dispatch the service UAV 104 if there is authorization. Similarly, if a service UAV 104 has been dispatched, the dispatch component 206 may send a message stopping or recalling the service UAV 104 from providing the assistance.

The billing component 210 is configured to request, log, or obtain payment for assistance provided to a disabled UAV. In one embodiment, the billing component 210 receives or processes an indication of a payment amount authorized in exchange for dispatching the service UAV 104 to provide assistance to the disabled UAV. For example, the billing component 210 may determine that the payment amount is sufficient to provide an indicated or requested service to the disabled UAV. In one embodiment, the billing component 210 transmits a message to one or more of the disabled UAV, an owner of the disabled UAV, and an operator of the disabled UAV reporting a service charge to be assessed in exchange for dispatching the service UAV 104 to provide assistance to the disabled UAV. In one embodiment, the billing component 210 may log an incident for billing or tracking assistance to an active subscription account.

Figure 3:
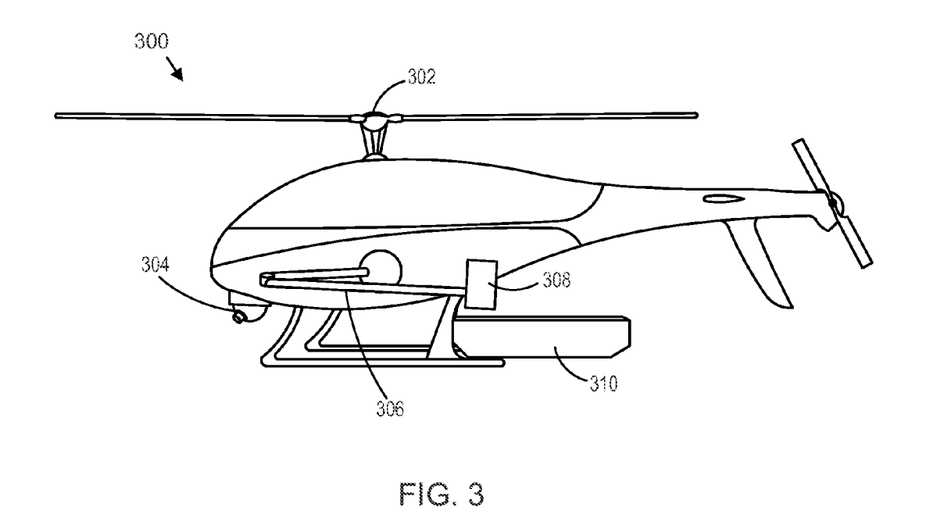
FIG. 3 is a side view of a service UAV, consistent with embodiments disclosed herein.

FIG. 3 illustrates a side view of a service UAV 300, according to one embodiment. The service UAV 300 is a helicopter-style UAV with a single lift rotor 302. In other, unillustrated embodiments, a service UAV may have multiple lift rotors (e.g., may be a quadropter), may be a fixed wing aircraft, or may use other types of flight propulsion or lift systems. The service UAV 300 includes an imaging system 304. For example, the imaging system 304 may include a gimbaled camera. The service UAV 300 may also include one or more of a radar system, a laser detection and ranging (LIDAR) system, lights for illuminating an area, and other sensors or devices to facilitate surveillance. The service UAV 300 includes a robotic arm 306, which may be used to manipulate or interact with a disabled UAV or a payload of the disabled UAV. The robotic arm 306 may include an end portion 308 that includes a claw, scoop, or other component to be used for interacting with a disabled UAV or other objects.

The service UAV 300 also includes a basket 310, which may operate as a payload compartment to hold or carry various components. For example, the basket 310 may be used to carry replacement fuel, batteries, or parts. Similarly, the basket 310 may be used to hold a disabled UAV or a recovered portion of the disabled UAV. In one embodiment, a payload compartment may be located within a body of the service UAV 300. In one embodiment, the service UAV 300 may have a larger size or greater range, greater payload carrying capacity, or the like, than the one or more UAVs it is designed to assist. The service UAV 300 may be powered by electricity, by a liquid or gaseous fuel, or by any other energy source.

Figure 4:
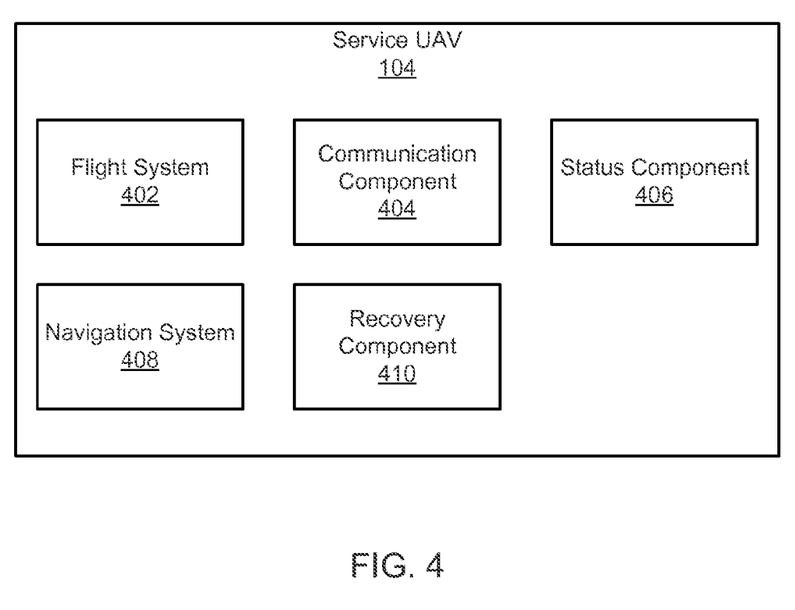
FIG. 4 is a schematic block diagram of a service UAV, consistent with embodiments disclosed herein.

FIG. 4 is a block diagram of service UAV 104, according to one embodiment. The service UAV 104 includes a flight system 402, a communication component 404, a status component 406, a navigation system 408, and a recovery component 410. The components 402-410 are given by way of example only. Some embodiments may include only one or any combination of two or more of the components 402-410, without limitation.

The flight system 402 includes one or more physical structures, components, and control circuitry to cause and enable the service UAV 104 to fly. For example, the flight system 402 may include one or more motors or engines to induce movement of the service UAV 104, one or more propellers actuated by the motors or engines, and/or one or more wings, air foils, or other structures to provide lift for the service UAV 104. For example, the service UAV 300 of FIG. 3 may include a motor or engine to provide a rotational force to the rotor 302 to induce flight of the UAV 300. A flight system 402 for UAV airplanes, helicopters, jets, or any other type of aerial vehicle may be used.

The communication component 404 allows the service UAV 104 to communicate wirelessly with other devices or systems, such as the UAV assistance system 102 and disabled UAVs. In one embodiment, the communication component 404 includes one or more wireless radios. For example, the communication component 404 may include one radio configured to communicate with a cellular network on a wireless spectrum and another radio configured to communicate with disabled UAVs using an unlicensed or licensed spectrum. In one embodiment, the communication component 404 is configured to relay wireless communication signals between the disabled UAV and a remote entity, such as the UAV assistance system 102, the third party system 108, or another system. For example, this may allow the service UAV 104 to assist a disabled UAV in communicating with other devices if a communication system of the disabled UAV has been damaged or lost power such that it can only communicate over short ranges.

In one embodiment, the communication component 404 may receive, process, or decode a message dispatching the service UAV 104 to provide assistance to a disabled UAV. In one embodiment, the communication component 404 may receive or process a transmission indicating a status of the disabled UAV. For example, the status may indicate one or more failures or statuses of systems of the disabled UAV. In one embodiment, the communication component 404 may receive a wireless transmission indicating that the service UAV 404 should not fly to the landing location of the first UAV. For example, the transmission may be sent by the disabled UAV, by the disabled UAV's owner or operator, by the disabled UAV's base, by the service UAV 104's base, from the UAV assistance system 102, and/or from a different service UAV.

In one embodiment, the communication component 404 may transmit information about what the service UAV 104 is doing. For example, the communication component 404 may indicate that the service UAV 104 is en route to a disabled UAV and may include an estimated time of arrival. The arrival time or other information may be sent to the UAV assistance system 102, to the disabled UAV, and/or to an owner or operator of the disabled UAV. In one embodiment, an indication that the service UAV 104 will fly to the landing location of the disabled UAV may be sent to other service UAVs, effectively calling them off.

The status component 406 is configured to determine a status of a UAV. For example, the status component 406 may determine whether a specific UAV is disabled or otherwise in need of assistance. In one embodiment, the status component 406 may determine a status of a UAV based on observing the UAV using one or more sensors. For example, the status component 406 may determine that a UAV is disabled, broken, crashed, or otherwise disabled based on directly observing the UAV using one or more imaging devices or sensors. For example, the status component 406 may determine that a UAV is disabled based on imaging the UAV with a camera. In one embodiment, the service UAV 104 may determine the status of the UAV based on a direct transmission from the first UAV. For example, a UAV may send out a signal indicating that it is disabled and the service UAV 104 may receive the signal. In one embodiment, the status component 406 may determine a disabled status of a UAV based on a message received from a UAV assistance system 102, third party system 108, or other service UAV. In one embodiment, wireless communications may be received from a base station 112 of a wireless network, such as a node of a cellular communications network.

In one embodiment, the disabled status determined by the status component 406 may include the portion of a UAV that is disabled or the type of assistance needed by the UAV. For example, the status component 206 may receive a message from a UAV assistance system 102, third party system 108, or other service UAV that indicates what assistance is needed or what portion of the UAV is disabled. In one embodiment, the disabled status may indicate that an energy storage component of the disabled UAV is low on fuel or power. In one embodiment, the disabled status may indicate one or more damaged components of the disabled UAV.

In one embodiment, the status component 406 may determine a landing location of a disabled UAV. For example, the status component 406 may determine a predicted or actual location of the UAV as determined based on direct sensor information or a signal received from the disabled UAV. As another example, the service UAV 104 may receive a message indicating the location of the disabled UAV from a UAV assistance system 102.

The navigation system 408 is configured to fly the service UAV 104. For example, the navigation system 408 may control a flight system 402 to cause the service UAV 104 to fly specific routes to desired locations, land the service UAV 104, or otherwise control a position of the service UAV 104. In one embodiment, the navigation system 408 includes a positioning system to determine a location of the service UAV 104. The positioning system may include a satellite navigation system, such as a global positioning system (GPS), or other positioning system.

In one embodiment, the navigation system 408 is configured to fly the service UAV 104 to a landing location of the disabled UAV in response to the status component 406 determining that the UAV is disabled. For example, the navigation system 408 may cause the service UAV 104 to fly to a location near the disabled UAV and/or land near the disabled UAV to provide assistance. In one embodiment, the navigation system 408 may cause the service UAV 104 to fly to a location indicated in a message received from a UAV assistance system 102, third party system 108, the disabled UAV, or another service UAV. In one embodiment, the navigation system 408 is configured to begin flying toward the disabled UAV based on a predicted landing location indicated in a first message, and to proceed to the landing location in response to a second message indicating an estimated or actual landing location. In one embodiment, the navigation system 408 estimates a time of arrival of the service UAV 104 at the landing site of the disabled UAV.

In one embodiment, the navigation system 408 determines a coverage area, such as a geographical coverage area, that is assigned to the service UAV 104. For example, a plurality of service UAVs 104 may have an assigned geographical area to ensure that proper coverage is maintained, and/or that the service UAVs 104 can provide assistance in a timely manner. In one embodiment, the navigation system 408 is configured to position the service UAV 104 within or near the coverage area by flying the service UAV 104 above the coverage area. In one embodiment, the navigation system 408 is configured to position the service UAV 104 within or near the coverage area by landing the service UAV 104 in or near the coverage area. In one embodiment, the navigation system 408 is configured to position the service UAV 104 within or near the coverage area in advance so that it is ready or available for a quick response to a disabled UAV when the status component 406 determines that a UAV is disabled. In one embodiment, the service UAV 104 may only assist disabled UAVs that land or have passed through a corresponding coverage area. In one embodiment, the service UAV 104 may respond to any request by a UAV assistance system 102, even if the UAV assistance system 102 indicates that assistance is needed in a region outside the coverage area.

The recovery component 410 is configured to provide assistance to a disabled UAV by recovering a disabled UAV, a portion of a disabled UAV, or a payload of a disabled UAV. For example, a UAV may carry valuable payloads that could be stolen, damaged, looted, or lost. As another example, knowledge about the UAV, including its operation, programming, or other aspects, may be important to competitors or others who wish to use, copy, or disrupt UAVs of a specific entity. In one embodiment, the recovery component 410 may be configured and sized to carry the disabled UAV, with or without payload. For example, the service UAV 104 may be larger than the disabled UAV and may be able to carry the disabled UAV inside or on a cable. In one embodiment, the recovery component 410 is configured to remove a portion of the disabled UAV or a payload from the disabled UAV. For example, the recovery component 410 may cause the service UAV 104 to remove a portion of the disabled UAV comprising control circuitry, a computer readable storage media, avionics, or another portion of the disabled UAV. In one embodiment, the service UAV 104 may grab a package from (or sample acquired by) the disabled UAV and deliver it to a delivery destination or other destination for safekeeping.

In one embodiment, the recovery component 410 may include one or more of a control element, an actuator, an arm, a claw, a scoop, a hook, a pulley, and a cable to change the position of or interact with the disabled UAV, a payload of the disabled UAV, or a portion of the disabled UAV. For example, robotic arm 306, end portion 308, and/or basket 310 of FIG. 3 may be part of or controlled by the recovery component 410. In one embodiment, the recovery component 410 may include one or more specialized tools for unscrewing screws, sawing parts, or otherwise removing portions or a payload of a specific type of UAV.

In one embodiment, the recovery component 410 recovers items by obtaining physical control over them. For example, the recovery component 410 may cause the service UAV 104 to bring a recovered part or UAV to a location or entity authorized by an owner of the disabled UAV. For example, the service UAV 104 may carry the recovered parts or UAVs to a warehouse or base of a disabled UAV. In one embodiment, the recovery component 410 causes the UAV 104 to take recovered portions to a safe location where damage or access is less likely to occur. For example, the recovered payloads, parts, or UAVs may be moved out of a roadway, away from areas where there are more people, or the like. As another example, the service UAV 104 may carry the UAV parts or payloads to a location easily recovered by land vehicles or authorized personnel. For example, the service UAV 104 may move the UAV parts or payload near a road or to a concealed area near a road where those with knowledge of the location can easily access the items.

In one embodiment, the recovery component 410 is configured to replenish a fuel source for a UAV. For example, if a UAV is disabled due to lack of energy or fuel, the service UAV 104 may bring fuel or energy to the disabled UAV. For example, the recovery component 410 may provide an electrical current to charge a battery or provide a liquid or gaseous fuel to fill up a fuel tank. In one embodiment, the recovery component 410 may remove a depleted battery or fuel tank and replace it with a full or replenished battery or fuel tank. For example, the recovery component 410 may be configured to remove an energy storage component (such as a battery or fuel tank) and then mount a replenished energy storage component. In one embodiment, the recovery component 410 may swap out the energy storage component so that the service UAV 104 carries away the depleted energy storage component and the previously disabled UAV is then able to operate and fly using the replenished energy storage component. In one embodiment, the service UAV 104 includes a payload area where one or more replenished energy storage components may be carried.

Figure 5:
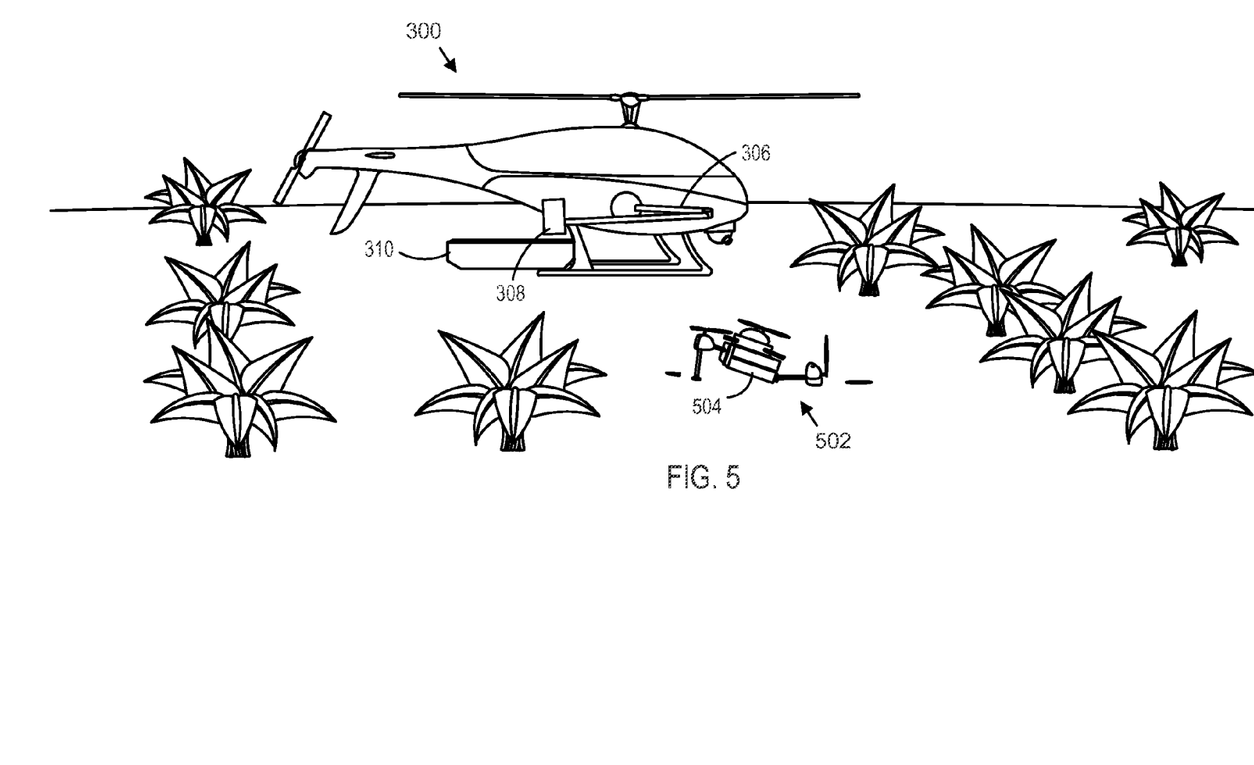
FIG. 5 is a perspective view of a service UAV landing near a disabled UAV, consistent with embodiments disclosed herein.

FIG. 5 is a perspective view illustrating a service UAV 300 that has landed near a disabled UAV 502 to provide assistance. The disabled UAV 502 is shown with a payload 504. For example, the disabled UAV 502 may have been tasked with delivering the payload to a customer or a delivery location. In one embodiment, the service UAV 300 may use the arm 306 and a claw, hook, or tool on the end portion 308 to manipulate the disabled UAV 502 or a portion of the disabled UAV 502. For example, the service UAV 300 may use the arm 306 to hook onto or grab the disabled UAV 502 and carry it to a safe location. In one embodiment, the service UAV 300 may pick up the disabled UAV 502, one or more parts of the disabled UAV 502, and/or a payload 504 for recovery. In one embodiment, the disabled UAV 502, one or more parts of the disabled UAV 502, and/or the payload 504 may be placed within the basket 310 for transportation.

Figure 6:
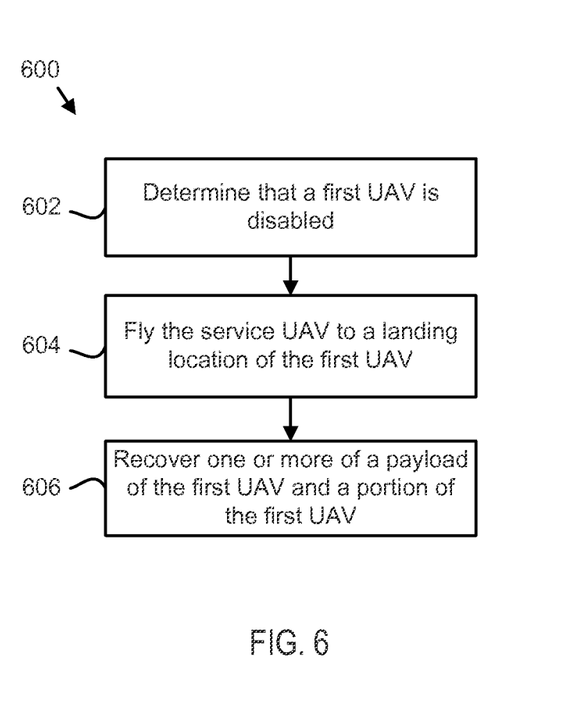
FIG. 6 is a schematic flow chart diagram illustrating a method for assisting a disabled UAV, consistent with embodiments disclosed herein.

FIG. 6 is a schematic flow chart diagram illustrating a method 600 for assisting a disabled UAV. The method 600 may be performed by another UAV, such as the service UAV 300 of FIG. 3 or the service UAV 104 of FIG. 4.

The method 600 begins and a status component 406 determines 602 that a first UAV is disabled. For example, the status component 406 may determine 602 that the first UAV is disabled based on imaging data obtained by a camera and/or based on a message received from the disabled UAV, another service UAV, a UAV assistance system 102, or a third party system 108. The status component 406 may also determine a location of the first UAV or type of assistance needed by the first UAV.

A navigation system 408 flies 604 the service UAV to a landing location of the first UAV. For example, the navigation system 408 may fly 604 to the landing location in response to the status component 406 determining 602 that the first UAV is disabled. A recovery component 410 recovers 606 one or more of the first UAV, a payload of the first UAV, and a portion of the first UAV. For example, the recovery component 410 may obtain physical control of one or more objects for moving or carrying to another location.

Figure 7:
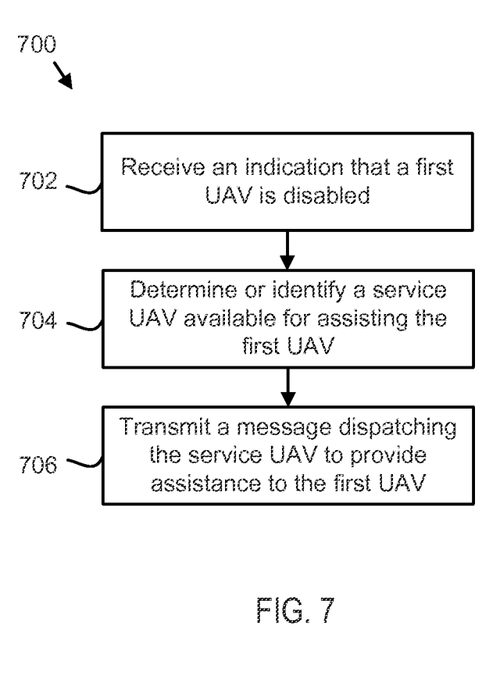
FIG. 7 is a schematic flow chart diagram illustrating a method for providing assistance to a disabled UAV, consistent with embodiments disclosed herein.

FIG. 7 is a schematic flow chart diagram illustrating a method 700 for providing assistance to a disabled UAV. The method 700 may be performed by a server, computer system, or other system, such as the UAV assistance system 102 of FIG. 2. For example, the UAV assistance system 102 may include one or more processors and computer readable media storing instructions that cause the processors and UAV assistance system 102 to perform the method 700.

The method 700 begins and a monitoring component 202 receives 702 an indication that a first UAV is disabled. In one embodiment, the indication that the first UAV is disabled is received in response to the first UAV making an unplanned landing or determining that it needs to make a landing that was not planned. For example, the monitoring component 202 may receive 702 an indication from a remote sensor or monitoring system that determines that the first UAV is disabled. As another example, the monitoring component 202 may receive 702 an indication sent by the first UAV or from a third party device or server that indicates that the first UAV is disabled.

The assistance component 204 determines 704 or identifies a service UAV that is available for assisting the first UAV. For example, the assistance component 204 may identify a service UAV that has an available status and/or is geographically near the disabled UAV. In one embodiment, the assistance component 204 may identify one or more service UAVs that are assigned to an area where the first UAV has landed or is predicted to land.

The dispatch component 206 transmits 706 a message dispatching the service UAV to provide assistance to the first UAV. For example, the dispatch component 206 may send a message that is routed through a cellular network to the service UAV. The message may include any information that the service UAV could use to enable it to provide assistance to the first UAV. In one embodiment, the message includes one or more of a location, a type of assistance to be provided, a disabled status, or any other information about the first UAV. The service UAV may then use this information to fly to the first UAV and provide assistance.

The terms "component" and "system" are used herein to indicate the implementation independence of various aspects of the disclosed embodiments. Components or systems may include one or more of processing logic, programmable logic, hardware circuitry, computer systems, computer readable media, actuators, sensors, or the like. Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer readable medium having stored thereon instructions that may be used to program a computer system or other electronic device to perform the processes described herein. The computer readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. In relation to communication, the term "receive" is given to mean one or more of receipt of a signal at an antenna, modem, or interface; decoding or processing of the signal to decipher data encoded within the signal; and interpreting the received data to determine a meaning, instruction, or attribute encoded within the message.

One suitable network includes a server and several clients. Other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general-purpose computers, computer programming tools and techniques, computer networks and networking technologies, digital storage media, authentication, access control, and other security tools and techniques provided by public keys, encryption, firewalls, and/or other means.

A subsystem may include a processor, a software module stored in a memory and configured to operate on the processor, a communication interface, sensors, user interface components, and/or the like. The components in each subsystem may depend on the particular embodiment (e.g., whether the system directly measures data or acquires the data from a third party). It will be apparent to those of skill in the art how to configure the subsystems consistent with the embodiments disclosed herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A service unmanned aerial vehicle (UAV) comprising:
a flight system for flying the service UAV;
a status component configured to determine that a first UAV is disabled;
a navigation system configured to fly the service UAV to a landing location of the first UAV in response to the status component determining that the first UAV is disabled; and
a recovery component that is part of the service UAV and configured to couple the service UAV to at least one of a payload of the first UAV or a portion of the first UAV while the service UAV carries the at least one payload or portion to a remote destination.

2. The service UAV of claim 1, wherein the recovery component comprises one or more of an actuator, an arm, a claw, a scoop, a hook, a pulley, and a cable to change a position of or interact with the first UAV.

3. The service UAV of claim 1, wherein the recovery component comprises one or more of an actuator, an arm, a claw, a scoop, a hook, a pulley, and a cable to change a position of or interact with a payload of the first UAV.

4. The service UAV of claim 1, wherein the recovery component comprises one or more of an actuator, an arm, a claw, a scoop, a hook, a pulley, and a cable to remove or to change a position of the portion of the first UAV.

5. The service UAV of claim 1, wherein the recovery component is configured to supply at least one of fuel and electrical current to an energy storage component on the first UAV.

6. The service UAV of claim 1, wherein the recovery component is configured to remove a portion of the first UAV comprising an energy storage component.

7. The service UAV of claim 6, wherein the energy storage component comprises a depleted energy storage component, wherein the recovery component is further configured to mount a replenished energy storage component on the first UAV.

8. The service UAV of claim 1, wherein the recovery component is configured to remove a portion of the first UAV comprising control circuitry of the first UAV.

9. The service UAV of claim 1, wherein the recovery component is configured to remove a portion of the first UAV comprising computer readable storage media of the first UAV.

10. The service UAV of claim 1, wherein the recovery component is configured to carry the first UAV.

11. The service UAV of claim 1, wherein the recovery component recovers by carrying one or more of a payload of the first UAV and a portion of the first UAV to a location or entity authorized by an owner of the first UAV.

12. The service UAV of claim 1, wherein the recovery component recovers by carrying one or more of a payload of the first UAV and a portion of the first UAV to a location where damage or access by another entity is less likely to occur.

13. The service UAV of claim 1, wherein the recovery component recovers by obtaining physical control of one or more of a payload of the first UAV and a portion of the first UAV.

14. The service UAV of claim 1, wherein the navigation system is further configured to determine a coverage area associated with the service UAV, wherein the navigation system is configured to position the service UAV within or near the coverage area prior to the status component determining that the first UAV is disabled.

15. The service UAV of claim 1, wherein the navigation system is configured to begin flying toward the first UAV based on a predicted landing location indicated in a first message, and to proceed to the landing location of the first UAV in response to a second message indicating the landing location.

16. The service UAV of claim 1, further comprising a communication component configured to wirelessly transmit a signal indicating that the service UAV will fly to the landing location of the first UAV.

17. The service UAV of claim 1, further comprising a communication component configured to receive a wireless transmission indicating that the service UAV should not fly to the landing location of the first UAV.

18. Computer readable storage media having collectively stored thereon executable instructions that, when executed by one or more processors, cause a service unmanned aerial vehicle (UAV) to:
determine that a first UAV is disabled;
fly the service UAV to a landing location of the first UAV in response to determining that the first UAV is disabled; and
recover one or more of a payload of the first UAV and a portion of the first UAV via a recovery component configured to couple the service UAV to at least one of the payload of the first UAV or the portion of the first UAV while the service UAV carries the at least one of the payload or the portion to a remote destination.

19. The computer readable storage media of claim 18, wherein the executable instructions further cause the service UAV to receive wireless transmissions indicating a status of the first UAV.

20. An unmanned aerial vehicle (UAV) assistance system comprising:
one or more processors; and
computer readable media collectively storing executable instructions that, when executed by the one or more processors, cause the UAV assistance system to:
receive an indication that a first UAV is disabled, wherein the indication that the first UAV is disabled is received in response to the first UAV making an unplanned landing;
determine a service UAV is available for assisting the first UAV; and
transmit a message dispatching the service UAV to provide assistance to the first UAV by coupling the service UAV to at least one of a payload of the first UAV or a portion of the first UAV while the service UAV carries the at least one payload or portion to a remote destination.

21. The UAV assistance system of claim 20, wherein the executable instructions further cause the UAV assistance system to receive an indication of assistance desired by the first UAV.

22. The UAV assistance system of claim 20, wherein the executable instructions further cause the UAV assistance system to receive an indication of a time by which assistance is desired by the first UAV.

23. The UAV assistance system of claim 20, wherein the executable instructions further cause the UAV assistance system to transmit to one or more of the first UAV, an owner of the first UAV, and an operator of the first UAV a message reporting the dispatch of the service UAV.

24. The UAV assistance system of claim 20, wherein the executable instructions further cause the UAV assistance system to transmit a message to one or more of the first UAV, an owner of the first UAV, and an operator of the first UAV reporting a service charge to be assessed in exchange for dispatching the service UAV to provide assistance to the first UAV.

25. The UAV assistance system of claim 20, wherein the executable instructions further cause the UAV assistance system to receive an indication deauthorizing the UAV assistance system to dispatch the service UAV to provide assistance to the first UAV.

26. A method comprising:
receiving an indication that a first unmanned aerial vehicle (UAV) is disabled, wherein the indication that the first UAV is disabled is received in response to the first UAV making an unplanned landing;
determining a service UAV is available for assisting the first UAV;
transmitting a message dispatching the service UAV to provide assistance to the first UAV; and
coupling the service UAV to at least one of a payload of the first UAV or a portion of the first UAV while the service UAV carries the at least one payload or portion to a remote destination.

27. The method of claim 26, further comprising determining that the first UAV corresponds to an active subscription account.

28. The method of claim 27, further comprising logging an incident for billing to the active subscription account.

29. The method of claim 26, wherein the message dispatching the service UAV comprises a predicted landing location for the first UAV.

30. The method of claim 29, further comprising transmitting a second message indicating an actual landing location.

31. The method of claim 26, wherein the message dispatching the service UAV further comprises an indication of assistance to be provided to the first UAV.

32. The method of claim 31, wherein the assistance to be provided comprises replenishment of an energy storage component.

33. The method of claim 31, wherein the assistance to be provided comprises recovery of one or more of a payload of the first UAV and a portion of the first UAV.

* * * * *